United States Patent [19]

Burke et al.

[11] 4,451,705

[45] May 29, 1984

[54] CALL COMPLETION CIRCUIT AND METHOD

[75] Inventors: Edmund T. Burke, West Long Branch; Patrick H. Gorman, II, Little Silver; James A. Henderson, Jr., Neptune; Nicholas K. Smith, Middletown, all of N.J.

[73] Assignee: Bell Telephone Laboratories, Incorporated, Murray Hill, N.J.

[21] Appl. No.: 383,315

[22] Filed: May 28, 1982

[51] Int. Cl.³ .......................... H04Q 3/64; H04Q 3/72
[52] U.S. Cl. .............................. 179/27 D; 179/18 FH
[58] Field of Search .............. 179/18 B, 18 D, 18 FH, 179/27 CA, 27 D, 27 FB, 27 FH, 84 C, 99 R, 99 M, 99 P, 27 DB

[56] References Cited

U.S. PATENT DOCUMENTS

| | | | |
|---|---|---|---|
| 3,660,611 | 5/1972 | Knollman et al. | 179/18 ES |
| 3,890,473 | 6/1975 | Warman et al. | 179/27 DB |
| 3,991,279 | 11/1976 | Morgan et al. | 179/18 BC |
| 3,991,280 | 11/1976 | James et al. | 179/18 BE |
| 4,046,972 | 9/1977 | Huizinga et al. | 179/99 M |
| 4,048,452 | 9/1977 | Oehring et al. | 179/27 D |
| 4,109,113 | 8/1978 | Allison, Jr. et al. | 179/99 R |
| 4,110,566 | 8/1978 | Shanley | 179/18 GF |
| 4,125,748 | 11/1978 | Nahabedian et al. | 179/18 BD |
| 4,150,257 | 4/1979 | Fenton et al. | 179/18 BE |
| 4,150,259 | 4/1979 | Fenton et al. | 179/18 BC |
| 4,197,430 | 4/1980 | Dowden | 179/27 D |
| 4,286,118 | 8/1981 | Mehaffey et al. | 179/18 AD |
| 4,289,934 | 9/1981 | Pitroda et al. | 179/27 D |
| 4,291,199 | 9/1981 | Densmore et al. | 179/18 AB |
| 4,296,282 | 10/1981 | O'Neil et al. | 179/99 LS |
| 4,313,035 | 1/1982 | Jordan et al. | 179/18 BE |

*Primary Examiner*—Thomas W. Brown
*Attorney, Agent, or Firm*—David H. Tannenbaum

[57] ABSTRACT

There is disclosed a combined business communication system and an ACD system where each station in the system is available to handle, on a per call basis, either ACD or regular incoming calls. The system is arranged to accept from any user at any station an ID uniquely associated with that user. The ID in turn then controls the ACD system to direct calls to the user in accordance with the ID information without regard to the station location of that user. Calls between system users are completed either in accordance with station identification numbers or in accordance with the ID number of the desired user.

8 Claims, 5 Drawing Figures

CALL COMPLETION CIRCUIT AND METHOD

BACKGROUND OF THE INVENTION

This invention relates to a communication system and more particularly to such a system where calls may be completed to a station either in accordance with the station identity or in accordance with the identity of a person currently using the system.

An automatic call distributor (ACD) system is one application of this concept. However, the call completion arrangement described here was applications in communication systems generally. In ACD systems incoming calls are completed to stations in accordance with a predetermined completion pattern. This pattern may, for example, depend upon the location of the origination of the call, or upon the trunk type of the incoming call. Often, the incoming call is to be completed to one or more specifically designated attendants. This presents a problem when the attendants are free to move between station terminals.

Often, it is desirable for one attendant to call another specific attendant, but the calling party may not know the present physical location of the desired called party. Also, in a typical ACD operation it is often necessary to display status information on an attendant-by-attendant basis. This requirement is difficult to achieve in situations where the attendants are free to move between terminals.

SUMMARY OF THE INVENTION

We have designed an ACD having the capability that each terminal position may be used for ACD as well as for regular calls, both incoming and outgoing. The users, prior to handling an ACD call from any terminal, dial a special dial code, thereby entering their personal dial codes (PDC) into the central processor. The current station location of each personal dial code is stored in status memory 16-2 in the station log in identification table (STA—LID). From that point onward until a new dial code is entered, or until the PDC is either removed or entered on another terminal, calls may be placed to the terminal either by dialing the terminal identification number or by dialing the PDC number of the user.

The system is also designed to allow intercom calls between terminals either in accordance with the identity of the terminal or in accordance with the identity of a person, not necessarily an ACD agent, presently using that terminal.

BRIEF DESCRIPTION OF THE DRAWING

The solution to the foregoing problems, together with the operation and utilization of the present invention, will be more fully apparent from the following description taken in conjunction with the drawing, in which.

GENERAL DESCRIPTION—BACKGROUND

Before beginning a general discussion of the specific features claimed it may be helpful to review in general terms the operation of an overall system in which the claimed feature can be utilized. It should be borne in mind that such a feature can be used in any number of similar type systems and thus background information on only one type of system will be presented. In addition, since communication system features may be used with different types of systems each dependent on different hardware constraints and upon different programming techniques, no attempt will be made to detail all of the steps used to control the overall system, as such would cloud the issue and unnecessarily lengthen this specification. Quantities mentioned were engineered for particular time and memory requirement and will not be the optimum for all such systems.

It will of course be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the feature may be used. The patent specification will provide the necessary logical steps necessary for the implementation and blending of the described feature into such a larger system, having many such features.

TYPICAL OVERALL SYSTEM OPERATION

Figure 1:
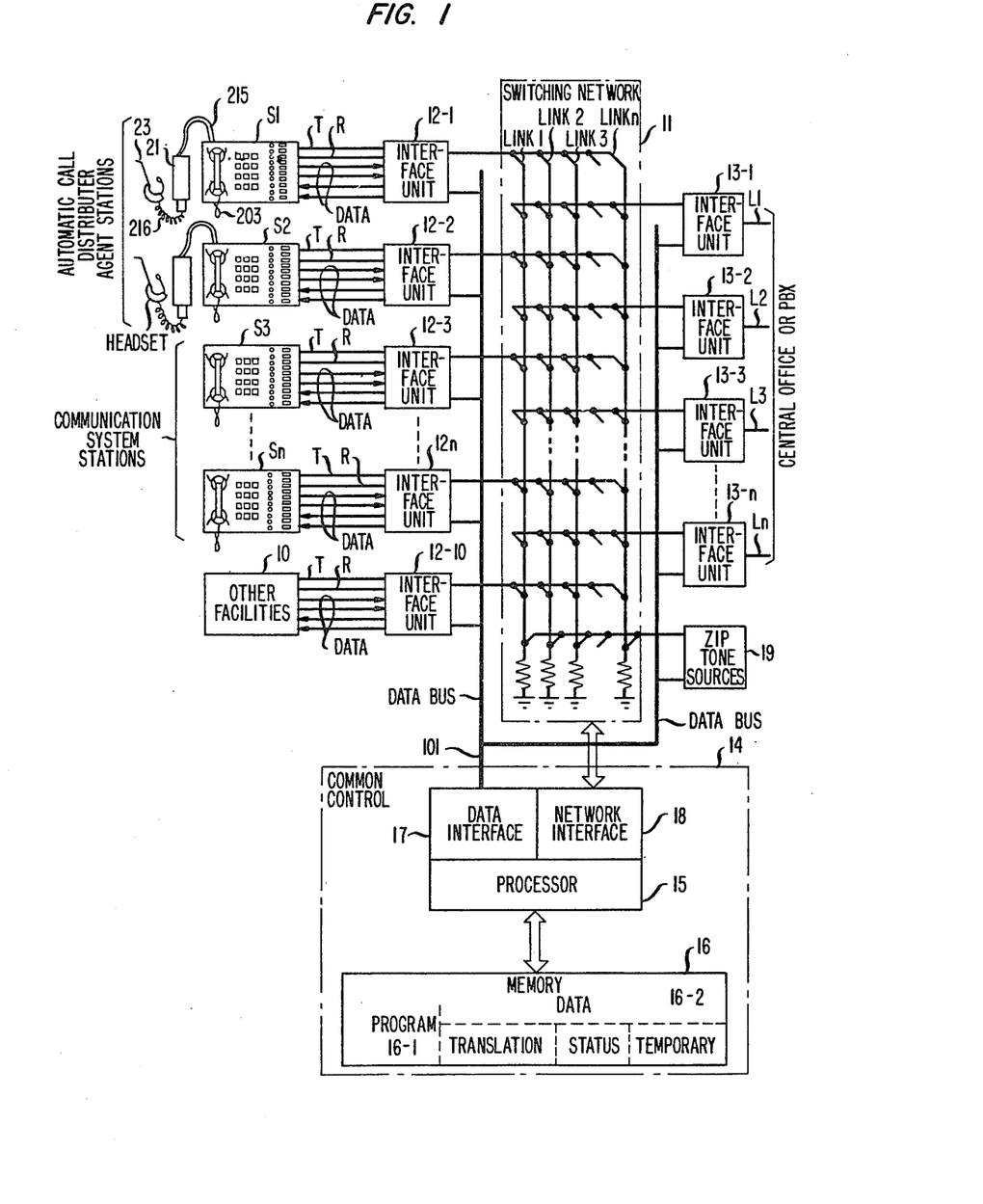
FIG. 1 shows a pictorial view of a combined ACD and communication system.

One such communication system where the structure claimed herein can be used is a station oriented solid-state, stored program control, business communication system. FIG. 1 shows a block diagram of such a system which combines the usual key system features (hold, visual indication, etc.) with many features only recently available.

These features are fully detailed in five issued U.S. patents, each directed to a different operational feature of a communication system. These patents are Allison et al, U.S. Pat. No. 4,109,113; Fenton et al, U.S. Pat. No. 4,150,259; Fenton et al, U.S. Pat. No. 4,150,257; Nahabedian, U.S. Pat. No. 4,125,748; and Densmore et al, U.S. Pat. No. 4,291,199. These five patents are incorporated by reference as though they were each reproduced in their entirety herein.

Call processing in the system is under the control of processor 15 in common control 14. Each station, such as Station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus 101 to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls.

Nonbutton key sets can be used as station positions where only station-to-station (intercom) calling and/or outward dialing, via dial access pooled facilities or a central answer position, are required. In this implementation the first (lower) 4 buttons on each MET station set are always the same. They are: Hold, +/−, and two system access buttons, each associated with the intercom number of the particular station. The +/− feature is described in the aforementioned patent of Fenton et al. The system access buttons are used to receive calls from other stations within the communication system (intercom) and to originate such calls or to access system facilities such as lines, paging ports, etc. Incoming calls may terminate on either system access button depending on their busy/idle status. If the lower one is busy, a second incoming call comes to the second (upper) one, giving a visual call waiting indication accompanied by a single audible ring if the station is off-hook. The system access buttons are also used in conferencing and call transfer features such as described in the aforementioned patent of Nahabedian et al. The remainder of the buttons on the MET station sets are flexible buttons and can be assigned to any of the button-activated station or answering position features, such as call coverage, as shown in the aforementioned patent of Fenton et al; and pooled line treatment, as shown in the aforementioned patent of Allison et al.

As shown in FIG. 1 there are three pairs of wires coming out of the electronic key telephone set to the interface unit: T&R, data in, data out. The T&R pairs are connected to switching network 11. In the example shown a space division network with n links is shown. It may be replaced by a time division with n time slots. The data link between the set and the processor is used to transmit information to the processor which will configure the switching network and send LED control signals back to the telephone sets accordingly. System facilities, such as system facility 10, is understood to include origination registers, tone circuits, stations, lines, trunks or any port which can be communication coupled to a link of the network.

Common control 14 consists of processor 15, interface units 17 and 18 and memory 16. The memory unit consists of a program store 16-1, and a data store 16-2. The data store is subdivided into the following:
A. Translation which contains the hardware configuration data. For example, the button assignments and station class of service.
B. Status which stores the state of the system at a given moment. For the station, it contains
  (a) Station state: switchhook; +/− operation; whether actively connected to the network or not.
  (b) Button state: for each button
    (i) if I-USE is on
    (ii) what is the green status LED state
    (iii) which link is associated with calls on this button.
C. Temporary Data which is used to process a call and is a scratch-pad area.

A more complete description of the ACD operation is shown in co-pending concurrently filed application, Ser. No. 383,314, of E. T. Burke et al, which is hereby incorporated by reference herein. A typical common control processor works on a 25 ms work cycle. A high level executive program, TSK_DSP, controls the order of tasks executed in a work cycle. At the beginning of each cycle, a hardware real time interrupt is received by the processor. The interrupt handling routine sets a flag and returns to the interrupted task which in turn will relinquish control to TSK_DSP control, as soon as it reaches a convenient break point. The task dispenser decides which task is to be executed next according to a schedule. Basically these tasks fall into three categories:
(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 ms cycle, the system will perform routine maintenance functions until the next work cycle begins.

The following features can be implemented by the system discussed herein.

I-USE INDICATION

Figure 2:
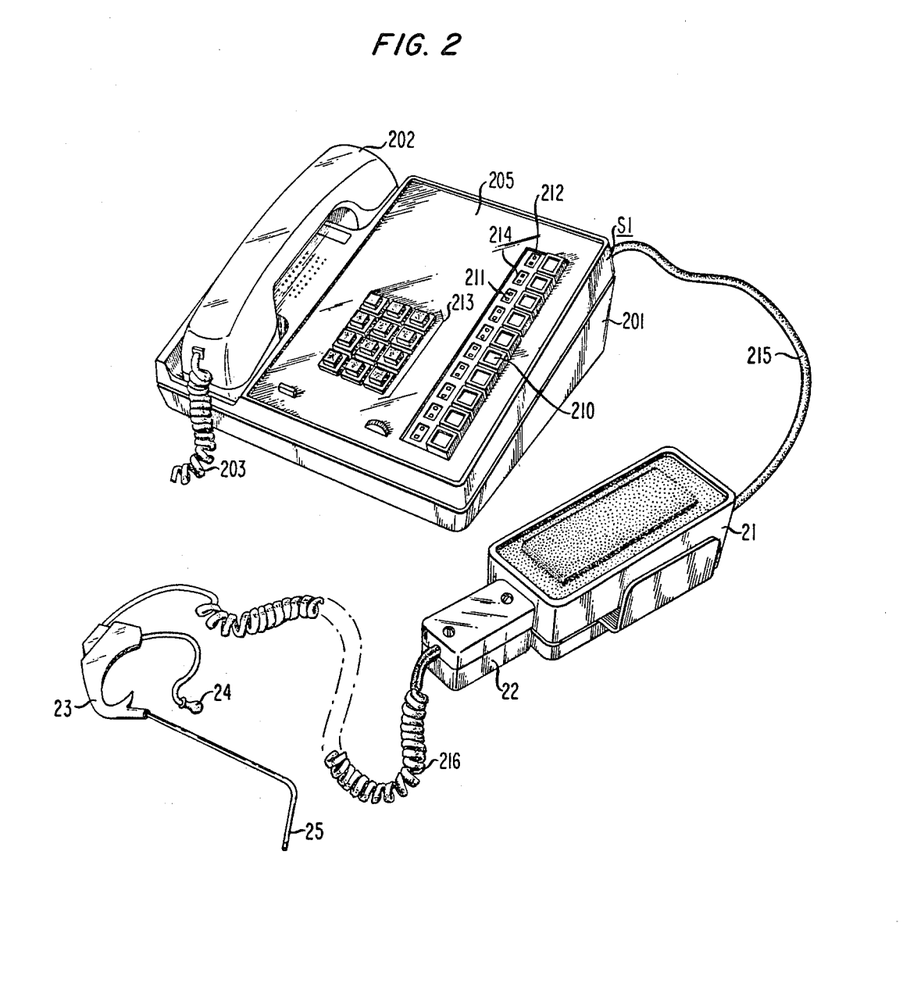
FIG. 2 shows a pictorial view of one station set to which a headset has been connected for ACD operation.
Figure 3:
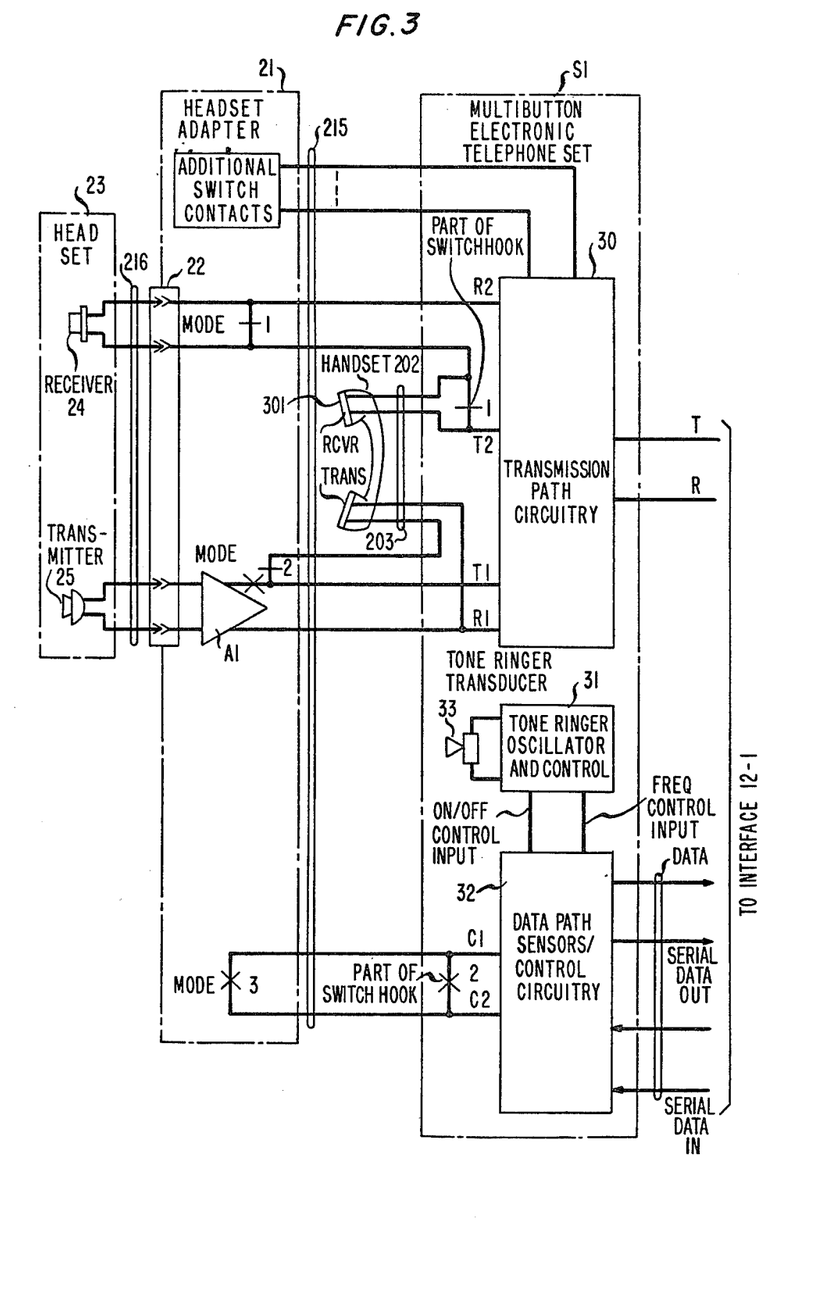
FIG. 3 shows in more detail a schematic of the transmission path and control circuitry for ACD operation.

This feature provides a red I-Use LED, such as LED 212, FIG. 2, associated with each line access button (tracking feature, system access, pooled facilities access, personal line access, automatic intercom, and call coverage). When off-hook, this LED indicates the line to which the station is connected. When on-hook, this LED indicates the line to which the station would be connected upon going off-hook.

LINE STATUS INDICATION

Call status indications are given by means of a green status LED such as LED 211, FIG. 2, associated with each line access button (tracking feature, system access, pooled facilities access, personal line access, automatic intercom, and call coverage). The status LED flashes (500 ms on, 500 ms off) during the ringing state, lights steadily during the busy state, and winks (450 mn on, 50 ms off) during the hold state.

AUTOMATIC INTERCOM

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may anser the call by depressing the automatic intercom button and going off-hook.

DISTINCTIVE ALERT

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time. These tones are controlled by data sent to each station over the data bus.

PERSONAL LINE ACCESS

This feature provides a communication channel between a station user and a dedicated outside line via the switching network. Unlike pooled facilities, which can also be accessed by dial codes, personal lined are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

POOLED FACILITIES—BUTTON ACCESS

Upon depressing a pooled facilities access button and going off-hook, the station user is connected to an idle line facility belonging to a common pool of outside lines (e.g., CO, FX, WATS, etc.). The status and I-Use LEDs associated with the pooled facilities access button will light steadily, and the station user will be free to complete the call. If no idle facilities are available (facilities by indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

FACILITIES BUSY INDICATION

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

PRIME LINE PREFERENCE

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

RINGING LINE PREFERENCE

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable—no line or prime line.

STATION-TO-STATION CALLING

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611, issued May 2, 1972, in the name of Knollman et al, and in U.S. Pat. No. 4,046,972, issued Sept. 6, 1977, in the name of Huizinga et al, which patent also shows the multibutton electronic set, which patent describes the items designated by number in FIG. 2. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162, filed on Oct. 27, 1977, now U.S. Pat. No. 4,110,566.

GENERAL DESCRIPTION

In the status memory (FIG. 1, item 16-2) there is stored for each button on each station set the following information:
(a) The instantaneous state of each LED (on/off) for the two LEDs associated with the button;
(b) the long term state of each LED (flash, wink, on, off). This is called the Station Button Status for the status LED and the Station Button I-use for the I-use LED.

Also, for each station set, there is a status memory location for recording:
(c) the last detected instantaneous state of the station's switch-hook and buttons;
(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. That message is stored in status memory 16-2 in the station lamp scan output table (SLSO). This data is transmitted to the MET using the data interface (FIG. 1, item 17). The MET returns to the processor, via the data interface, the instantaneous state of its switch-hook and buttons, which is stored in status memory 16-2 in the data structure station MET input/output table (SEIO).

The returned data is compared with that in (c) above and if there are any changes, records these in a temporary buffer for that station in 16-2 called station change/timing byte table (SCTB). At a different time, another processor action picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical forms, e.g., a value of 1 identifies a personal line button, a value of 2 identifies a pooled line button, 3 identifies a track button, etc.

For a speech-type button (e.g., system access, auto-intercom, personal line, pooled line, call coverage, etc.), there are 4 possible states which will be shown to the user on the status LEDs: Namely, busy—(LED flash), hold—(LED wink).

This information is stored in the status data memory (16-2 in FIG. 1) coded in numerical forms. For a non-speech-type button like message-waiting, the same data format is used although the valid states may reduce to 2 (busy and idle).

As described, the scan routine in the system detects and reports a button push by the MET user to a buffered area to wait for the process routines to process. When such a change is processed by the process routines, the button identification information, SBID, stored in 16-2 is first checked, then the button status information stored in 16-2 is checked. The processor is thus able to interpret the button push to a specific user command and uses the proper programs stored in 16-1 to process the change. For example, button selection of (1) an idle (from SELP or SELS) speech-type (from SBID) button implies call origination requiring the associated facilities.

(2) a ringing (from SEIO or SELS) speech-type (from SBID) button implies answer a ringing call.

DETAILED DESCRIPTION—PERSONAL DIAL CODE

Figure 4:
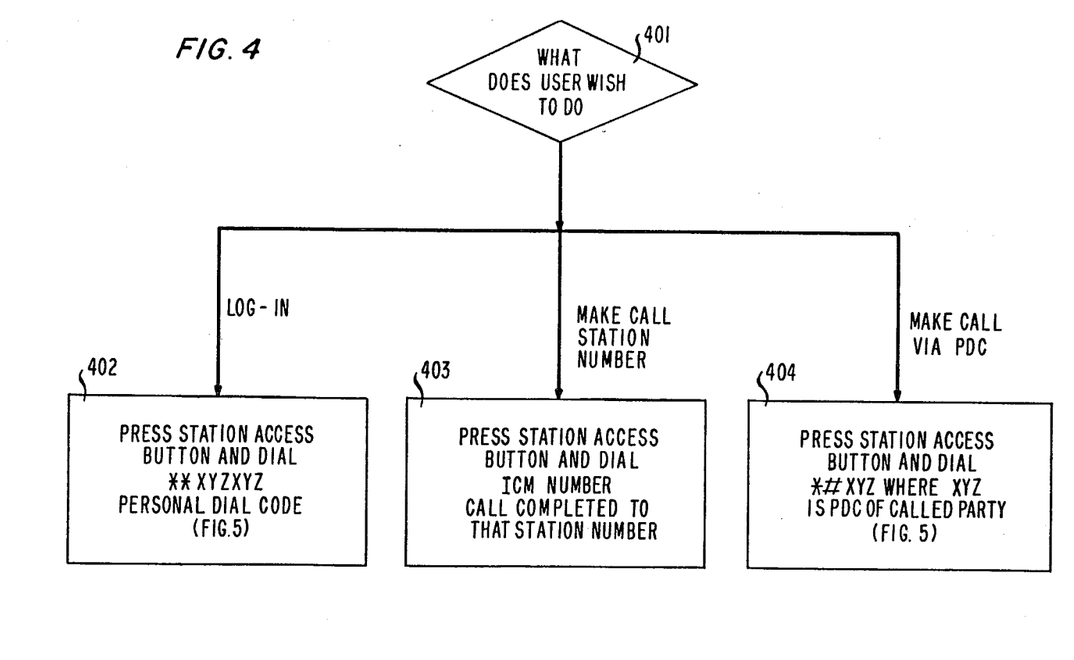
FIGS. 4 and 5 show flow charts of the operation of the call completion arrangement.

FIG. 4 shows an overview of the three basic decisions which must be made any time a user decides to place a telephone call. Process 402 represents the condition where the agent or other communication system user wishes to log in using the personal dial code (PDC). To do this, the user operates the asterisk (*) key twice followed by the three-digit personal dial code repeated twice.

Process 403 represents a situation where the user wishes to place a call to a particular station by using the intercom number of the station, and the situation in process 404 depicts the situation where the user wishes to place a call to another party by using the personal dial code of that called party. In this situation, the user would operate the asterisk and pound (number) buttons (*#) followed by the three-digit number of the called party. Using this mode of calling, the physical location of the terminal is not important, but rather the call is directed to the terminal where the called party is currently located.

In addition to the ACD environment where agents routinely move from station to station, such a feature would find acceptance, for example, in a conference-room situation where many people gather, each one using the same telephone to establish their login presence. Thus, incoming calls to any of the people at the conference would all terminate at the same conference room telephone.

As shown in process 501 (FIG. 5), the user presses the system access button on a telephone station set and dials the desired digits. If the first digit dialed is not an asterisk (*), then box 502 directs the call to process 504 where it is determined that this is not a login or a call by personal dial code and thus no further action is necessary. If the first digit dialed is an asterisk (*), then process 503 waits for the second digit. If the second digit is not an asterisk (*) or pound (#), then again the call is treated as a regular intercom dial call via process 504. If the second digit however, is an asterisk (*), then the system determines that the user is logging into this terminal and process 505 then accepts the three-digit personal dial code and process 506 then accepts three more digits which should be identical to the first three digits.

Figure 5:
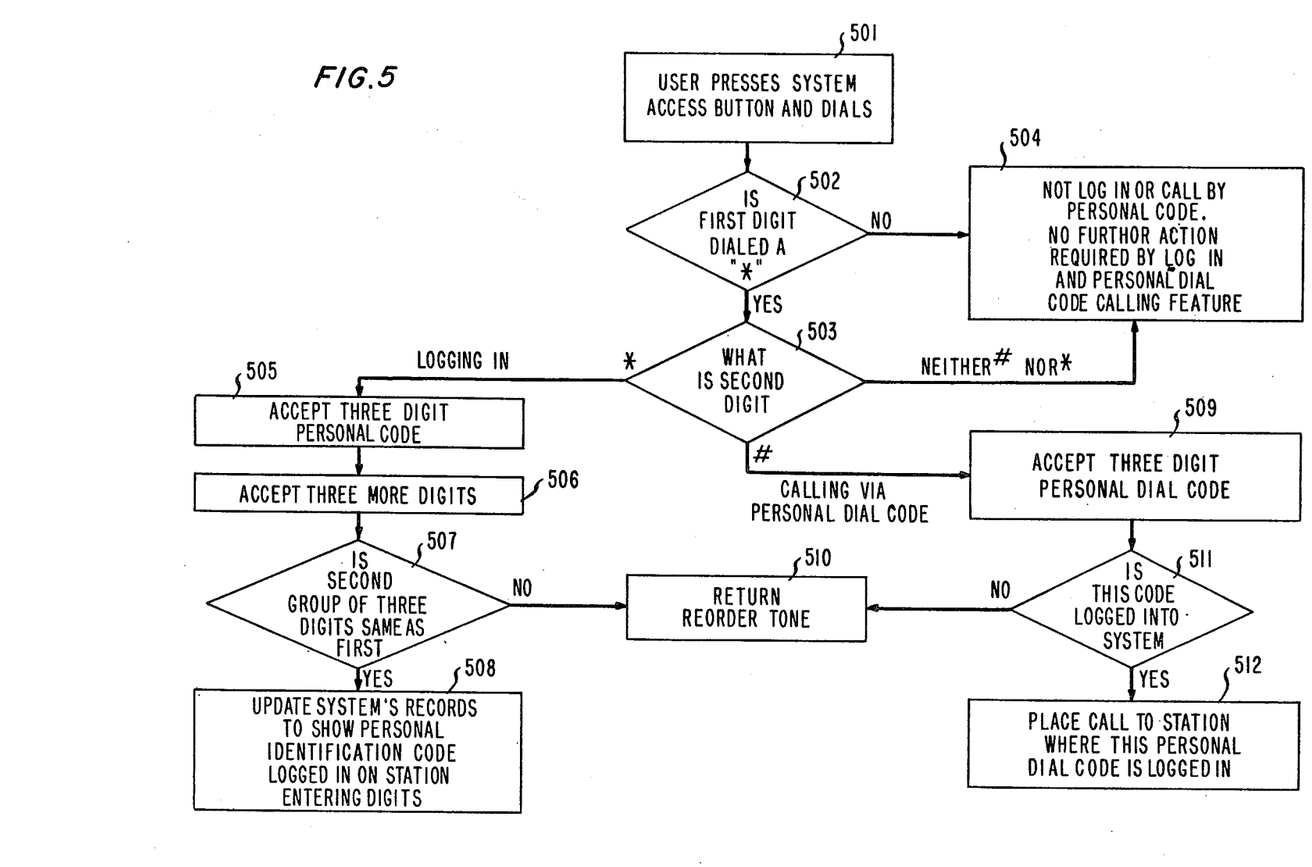

Process 507 compares these two sets of digits, and if they are not the same, provides reorder tone via process 510 to the user. However, if both sets of PDC digits match, then process 507 calls process 508 which in turn updates the system records in the STA—LID table in 16-2 to show that the personal identification code is logged in at the terminal from which the digits were entered.

Turning now to box 503, if the second digit dialed following an asterisk (*) is a pound (number) symbol (#), then the system determines that the user at this terminal is calling another party via the personal dial code of the called party. In this situation, process 509 accepts the three-digit personal dial code and process 511 then determines whether or not this code is currently logged into this system. If the answer is no, reorder tone is provided to the calling user. If, on the other hand, process 511 determines that the accepted three-digit personal identification code is valid and the associated agent is logged into the system, then the call is placed to the terminal where the personal dial code was last logged in via process 512. This is accomplished via a table of associations stored in the data array STA—LID in 16-2 which is constructed by process 508.

CONCLUSION

While we have shown one embodiment of call completion to users or attendants, other completion routines can be used. For example, a user logging in with a PDC could always be associated with a particular split and thus incoming calls having certain parameters can be completed to that user without regard to the station at which the user is located. This can be accomplished by establishing a store of personal dial codes corresponding to certain splits and when a user or attendant logs in at a terminal that terminal will be assigned to the preestablished split. This would be accomplished by modifying the login process to take the proper information from the PDC store and place it in the station-split association table in status memory 16-2. It is also easily possible to allow calls incoming to be completed to a terminal out of turn if a personal dial code is received.

What is claimed is:

1. An automatic call distribution system wherein calls incoming to the system are completed to an agent in accordance with a call completion algorithm which identifies an agent from a pool of such agents, said system comprising a plurality of terminals to which calls incoming to the system can be completed, means for receiving dialing signals from said terminals, some of said dialing signals including a special identifying signal, means for accepting from said terminals unique sets of signals for identifying the current presence of particular agents thereat, means for establishing from said unique signals a list of agents corresponding to terminals from which said unique signals are received, means for completing a connection to an identified agent located at a particular terminal in accordance with said list, means for completing a connection from a calling terminal to a called terminal in accordance with received dialing signals identifying said called terminal, and means for completing a connection from a calling terminal to a called terminal in accordance with said established list when said dialing signals include said special identifying signal.

2. The invention set forth in claim 1 wherein said accepting means includes means for verifying the accuracy of said identifying signals.

3. The method of operating a communication system having a plurality of terminals, each terminal having an identity used by said system for the completion of communication connections thereto, said method including the steps of accepting from a user at any terminal a unique identification number assigned to that user, temporarily associating said unique user identification number from a particular terminal with said particular terminal, and completing calls from a calling user to said particular terminal alternatively in accordance with the receipt of signals representative of said terminal identity or in accordance with the receipt of said unique user identification number currently associated with said particular terminal, said completing step being operative in response to a special signal received from said calling user in conjunction with said unique user identification number for distinguishing between calls which are to be completed in accordance with said terminal identity and calls which are to be completed in accordance with said unique user identification number.

4. The method of operating a communication system having a plurality of terminals, each terminal having an identity used by said system for the completion of communication connections thereto, said method including the steps of accepting from a user at any terminal a unique identification number assigned to that user, temporarily associating said unique user identification number from a particular terminal with said particular terminal, and completing calls from a calling user to said particular terminal alternatively in accordance with the receipt of signals representative of said terminal identity or in accordance with the receipt of said unique user identification number currently associated with said particular terminal, said system being arranged to complete calls to selected users in accordance with a call completion algorithm, and said completing step including the step of directing calls to an individual user selected by said algorithm to the particular terminal currently associated with said individual user.

5. An automatic call distribution method wherein incoming calls are completed to terminals attended by agents with a call completion algorithm which identifies an agent from a pool of such agents, said method comprising the steps of receiving dialing signals from said terminals, some of said dialing signals including a special identifying signal, accepting from said terminals unique sets of signals for identifying the current presence of particular agents thereat, establishing from said unique signals a list of agents corresponding to terminals from which said unique signals are received, completing a connection to an identified agent located at a particular terminal in accordance with said established list, and completing a connection from a calling terminal to a called terminal alternatively in accordance with received dialing signals identifying said called terminal or in accordance with said established list when said dialing signals include said special identifying signal.

6. An automatic call distributing system having a plurality of terminals, each terminal having an identity used by said system for the completion of communication connections thereto, said system comprising means for accepting from an attendant at any terminal a unique identification code assigned to that attendant, means for temporarily associating an accepted attendant identification code from a particular terminal with said particular terminal, means including said temporarily associated attendant identification code for assigning said terminals to splits, and means for completing calls to a particular terminal in accordance with the availability of said terminal to answer said calls.

7. The invention set forth in claim 6 wherein said calls completing means includes means for completing calls to an attendant in accordance with the receipt of said accepted attendant identification code.

8. The invention set forth in claim 6 wherein said calls completing means includes means for placing calls in queues associated with each said split and for completing calls to any available terminal assigned to said split, and means for completing calls having associated therewith an attendant identification code only to the terminal currently associated with said attendant identification code.

* * * * *